United States Patent [19]

Boden et al.

[11] Patent Number: 5,194,984
[45] Date of Patent: Mar. 16, 1993

[54] STILBAZOLIUM SALT AND OPTICALLY NON-LINEAR DEVICES INCORPORATING SAME

[75] Inventors: Eugene P. Boden, Scotia; Peter D. Phelps, Schenectady; Christopher P. Yakymyshyn, Saratoga Springs; Kevin R. Stewart, Schenectady, all of N.Y.

[73] Assignee: General Electric Company, Schenectady, N.Y.

[21] Appl. No.: 712,282

[22] Filed: Jun. 10, 1991

[51] Int. Cl.[5] .................. G02F 1/00; G02F 1/35; G02B 6/00; C07D 211/70
[52] U.S. Cl. .................. 359/321; 359/322; 359/326; 385/143; 385/145; 546/329
[58] Field of Search ........... 546/329; 359/252, 321, 359/322, 326, 246, 250; 385/141, 143, 145

[56] References Cited

U.S. PATENT DOCUMENTS

| | | | |
|---|---|---|---|
| 2,970,149 | 1/1961 | Huebner | 546/329 |
| 3,105,836 | 10/1963 | Huebner | 546/329 |
| 3,795,436 | 3/1974 | Boller et al. | 359/322 |
| 4,269,941 | 5/1981 | Ichimura | 522/78 |
| 4,558,133 | 12/1985 | Beecken | 546/329 |
| 4,818,616 | 4/1989 | Milverton et al. | 546/329 |
| 5,094,553 | 3/1992 | Yakymyshyn et al. | |

FOREIGN PATENT DOCUMENTS

| | | | |
|---|---|---|---|
| 62-211622 | 9/1987 | Japan . | |
| 2211622 | 9/1987 | Japan | 546/329 |
| 2297529 | 12/1990 | Japan | 546/329 |

OTHER PUBLICATIONS

G. R. Meredith, "Prospect of New Nonlinear Organic Materials", *Nonlinear Optics: Materials and Devices;* Edited by Flytzanis and Oudar (©Springer-Verlag Berlin Heidelberg) (1986) pp. 116–127.
Marder et al., Science, 245, 626-8 (1989).

*Primary Examiner*—Bruce Y. Arnold
*Assistant Examiner*—Evelyn A. Lester
*Attorney, Agent, or Firm*—William H. Pittman

[57] ABSTRACT

4'-Dimethylamino-4-methylstilbazolium methanesulfonate is prepared by the reaction of methyl methanesulfonate with 4-picoline followed by condensation with p-dimethylaminobenzaldehyde. Its hydrated form has second harmonic generation optical properties, but this is not true of the anhydrous form. Thus, the hydrated form is useful in the production of optical waveguides, spatial light modulators and the like.

6 Claims, No Drawings

STILBAZOLIUM SALT AND OPTICALLY NON-LINEAR DEVICES INCORPORATING SAME

This invention relates to optically non-linear chemical compounds, and more particularly to the use of one compound of this type in optical devices.

Organic non-linear optical materials that display high second harmonic generation (hereinafter sometimes "SHG") properties are potentially useful for applications which require high speed optical modulators. Such applications include high speed long distance data links and electric field sensors for use in electromagnetically noisy environments. In addition, such materials provide efficient wavelength shifting capability for optical and infrared remote sensing (e.g., of pollutant particulate concentration) and diode laser frequency doubling for optical data storage.

Certain organic compounds having large SHG properties are known in the art. Several, including 4'-dimethylamino-4-methylstilbazolium p-toluenesulfonate, are disclosed in Marder et al., *Science*, 245, 626–628 (1989). It has more recently been discovered that said p-toluenesulfonate can be converted to a hydrated form with no SHG properties. The hydrated form, and the use of both forms in various types of optical equipment, are disclosed and claimed in copending, commonly owned application Ser. Nos. 07/618,807, and 07/618,809, now U.S. Pat. No. 5,094,553, now abandoned.

The present invention provides another chemical compound useful in the fabrication of optical modulators and optical frequency shifting devices for use in applications such as the aforementioned ones. The light transmitting properties of said compound are based on different crystalline structures and degrees of hydration thereof; in this case, the hydrate has SHG properties and the anhydrous form does not. Also provided are various types of optical apparatus incorporating said compound.

In one of its aspects, the present invention is the compound 4'-dimethylamino-4-methylstilbazolium methanesulfonate (hereinafter sometimes designated "DASMS"), having the formula

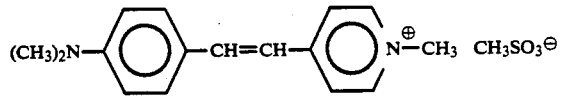

The crystals of anhydrous DASMS are centrically oriented and are therefore free from second order non-linear optical properties. Its hydrated form of forms, however, do have such properties as noted hereinafter. Another aspect of the invention, therefore, is DASMS in optically second order non-centrosymmetric hydrated form.

DASMS in its anhydrous form is conveniently prepared by the reaction of methyl methanesulfonate with 4-picoline (4-methylpyridine) followed by condensation with p-dimethylaminobenzaldehyde, using a lower alkanol as solvent. Its solution in the lower alkanol is deep red in color, but when isolated as a solid and dried, it exists as an orange powder. When redissolved in alkanol or a mixture of alkanol and an aliphatic hydrocarbon, it again turns red. Upon exposure of the orange powder to moist air, a green color develops which is attributable to hydration. The green phase has a second harmonic generation powder efficiency of 1200, as compared to a urea standard which is assigned a value of 1. For the sake of comparison, the corresponding p-toluenesulfonate in its anhydrous form has a second harmonic generation powder efficiency of 1000.

The hydrated form has been shown by X-ray crystallography to comprise alternate cation and anion layers. The anion layer consists of methanesulfonate ions with each ion being bonded to water molecules in a roughly pentagonal configuration. The overall geometry of the crystal is very similar to that of the corresponding p-toluenesulfonate in anhydrous form.

Thus, the hydrated form is non-centrosymmetrically ordered, a necessary condition for SHG properties. The anhydrous form, on the other hand, is centrosymmetric.

By reason of its SHG activity, hydrated DASMS in single crystal form, when suitably cut, polished and oriented, is effective to shift the frequency or wavelength of an incident beam of light to a new value while maintaining optical coherence. Therefore, another aspect of the invention is an optical device comprising means for propagating a beam of light and frequency shifting means comprising a single crystal of hydrated DASMS on which said beam of light is incident.

A single crystal of hydrated DASMS is useful as a bulk electrooptic modulator to modify the optical phase or polarization state of light propagating through said crystal by application of an electric field to said crystal in the region of light propagation. Amplitude modulation of the light may then be achieved by the use of interference or polarization techniques well known in the art. A plurality of such modulators arranged in a linear or planar array forms a spatial light modulator.

Accordingly, still another aspect of the invention is a spatial light modulator comprising a plurality of crystals of hydrated DASMS as an electrooptic material, means for applying an electric field to said crystals and light interference or polarization means adapted to modulate the amplitude of a portion of a light beam incident on said plurality of crystals.

Another design of spatial light modulators is based on the phenomenon of total reflection of a light beam when passing through a first material and incident upon a second material of lower refractive index than that of the first material, at an angle of incidence larger than the critical angle. The critical angle is dependent on the arc sine of the ratio of the refractive indices of the two materials.

When the second material is DASMS, reduction of the refractive index and hence the critical angle is possible by application of an electric field. Amplitude modulation of the incident beam can thus be achieved by orienting its angle of incidence to be between the critical angle with no applied field and the critical angle with a field applied.

Still another aspect of the invention, therefore, is a spatial light modulator comprising a first light transmitting material; a second light transmitting material consisting of hydrated DASMS, said second material having a lower refractive index than said first material; and means for applying an electric field to said second material.

It is also possible to fabricate optical waveguides in which hydrated DASMS is employed as an electrooptic core and an optically linear cladding material deposited thereon. Said cladding material is preferably anhydrous DASMS. Such waveguides can thus be produced by selectively dehydrating the surface of an element consisting of hydrated DASMS. The optical phase, optical polarization state or spatial mode profile of light traveling through the waveguide may than be altered by applying an electric field and employing interference or polarization techniques as described hereinabove.

A still further aspect of the invention, therefore, is an optical waveguide comprising a light-transmitting core comprising DASMS in hydrated form and an optically linear cladding material partially or entirely enclosing said core. In a preferred embodiment of this aspect, the cladding material is anhydrous DASMS.

The invention is illustrated by an example in which a 1-liter flask equipped with a condenser and magnetic stirrer was charged with 350 ml. of ethanol, 32.2 grams (1.05 equivalents) of 4-picoline and 27.9 ml. (1 equivalent) of methyl methanesulfonate. The mixture was heated under reflux for 1 hour, after which 51.7 grams (1.05 equivalents) of 4-dimethylaminobenzaldehyde was added, followed by 5 ml. of piperidine. Upon heating under reflux overnight, the reaction mixture turned deep red.

The mixture was cooled and poured into 2 liters of ether. The resulting precipitate was collected, washed with ether and vacuum dried at 70°–80° C. for 24 hours. The desired 4'-dimethylamino-4-methylstilbazolium methanesulfonate was isolated in 90% yield as an orange powder. Its identity was confirmed by proton nuclear magnetic resonance spectroscopy and X-ray crystallography.

Upon dissolving DASMS in a hot mixture of petroleum ether and ethanol in a 4:1 volume ratio followed by slow cooling, red platelets having a centric space group were obtained. They turned green upon exposure to air but remained red if dried at 213°–218° C. under vacuum conditions. Upon a second recrystallization from petroleum ether-ethanol, purple needles were obtained which remained purple upon drying.

An aqueous solution of DASMS at a concentration of 0.1 g./ml. was placed in a chamber containing tetrahydrofuran, whereupon triangular crystal platelets were produced on the surface of the solution.

What is claimed is:

1. The compound 4'-dimethylamino-4-methylstilbazolium methanesulfonate in optically second order non-centrosymmetric hydrated form.

2. An optical waveguide comprising a light-transmitting core consisting of 4'-dimethylamino-4-methylstilbazolium methanesulfonate in hydrated form and an optically linear cladding material partially or entirely enclosing said core.

3. An optical waveguide according to claim 2 wherein said cladding material comprises anhydrous 4'-dimethylamino-4-methylstilbazolium methanesulfonate.

4. A spatial light modulator comprising a plurality of crystals of hydrated 4'-dimethylamino-4-methylstilbazolium methanesulfonate as an electrooptic material, means for applying an electric field to said crystals and light interference or polarization means adapted to modulate the amplitude of a portion of a light beam incident on said plurality of crystals.

5. A spatial light modulator comprising a first light transmitting material; a second light transmitting material adjacent thereto consisting of hydrated 4'-dimethylamino-4-methylstilbazolium methanesulfonate, said second material having a lower refractive index than said first material; and means for applying an electric field to said second material.

6. An optical device comprising means for propagating a beam of light and frequency shifting means comprising a single crystal of hydrated 4'-dimethylamino-4-methylstilbazolium methanesulfonate on which said beam of light is incident.

* * * * *